United States Patent
Kariya et al.

(10) Patent No.: US 8,624,914 B2
(45) Date of Patent: Jan. 7, 2014

(54) IMAGE PROCESSING APPARATUS AND IMAGE PROCESSING METHOD

(75) Inventors: Shinichi Kariya, Kanagawa (JP); Jin Satoh, Nara (JP); Hirotoshi Maegawa, Toyko (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 212 days.

(21) Appl. No.: 12/744,702

(22) PCT Filed: Jul. 13, 2009

(86) PCT No.: PCT/JP2009/003279
§ 371 (c)(1),
(2), (4) Date: May 26, 2010

(87) PCT Pub. No.: WO2010/070778
PCT Pub. Date: Jun. 24, 2010

(65) Prior Publication Data
US 2011/0316869 A1    Dec. 29, 2011

(30) Foreign Application Priority Data

Dec. 18, 2008 (JP) ................................ 2008-321842

(51) Int. Cl.
*G09G 5/00* (2006.01)
*G09G 5/02* (2006.01)
*G06T 15/00* (2011.01)
*H04N 7/00* (2011.01)
*G06K 9/00* (2006.01)
*G06K 9/40* (2006.01)
*A63F 9/24* (2006.01)
*G06F 3/048* (2013.01)
*H04N 5/46* (2006.01)

(52) U.S. Cl.
USPC ........... 345/589; 345/419; 345/619; 345/630; 348/552; 348/557; 382/162; 382/167; 382/164; 382/254; 382/260; 715/706; 715/757; 463/31; 463/32

(58) Field of Classification Search
USPC ......... 345/418–419, 581, 589–591, 593–594, 345/619–620, 624, 630, 623, 625, 629, 664, 345/960; 348/552, 557–558; 358/518–519, 358/523, 537–538, 540, 448, 452–453; 382/162, 164–167, 170–171, 254, 260, 382/274, 276, 282, 305, 285; 715/273, 275, 715/700, 706, 757, 764, 782; 463/30–33
See application file for complete search history.

(56) References Cited

U.S. PATENT DOCUMENTS

| | | | |
|---|---|---|---|
| 6,411,744 B1 * | 6/2002 | Edwards | 382/294 |
| 6,785,667 B2 * | 8/2004 | Orbanes et al. | 1/1 |
| 2005/0179617 A1 * | 8/2005 | Matsui et al. | 345/7 |
| 2007/0126749 A1 | 6/2007 | Tzruya | |
| 2007/0252833 A1 * | 11/2007 | Kuroki | 345/427 |
| 2011/0050684 A1 * | 3/2011 | Maegawa et al. | 345/419 |
| 2011/0122130 A1 * | 5/2011 | Vesely et al. | 345/419 |
| 2012/0287044 A1 * | 11/2012 | Bell et al. | 345/158 |

FOREIGN PATENT DOCUMENTS

| | | |
|---|---|---|
| JP | 2002258785 | 9/2002 |
| JP | 2008012103 | 1/2008 |
| WO | 2006105660 A1 | 10/2006 |
| WO | 2008127705 A1 | 10/2008 |

OTHER PUBLICATIONS

International Preliminary Report on Patentability and Written Opinion for corresponding PCT application PCT/JP2009/003279, Jul. 5, 2011.
Written Opinion for corresponding PCT application PCT/JP2009/003279, Sep. 15, 2009.
International Search Report for corresponding PCT application PCT/JP2009/003279, Sep. 15, 2009.
European search report issued for corresponding European Patent Application No. 09817066.5, dated Oct. 9, 2013.
Nick: 11 the Co 1 our of (A Lot Of High Profile) Next-Gen Games, Aeropause Games, URL:http://www.aeropause.com/2006/10/thecolour-of-a-lot-of-high-profile-next-gen-games/ pp. 1-7, (Oct. 23, 2006).

\* cited by examiner

*Primary Examiner* — Wesner Sajous
(74) *Attorney, Agent, or Firm* — Matthew B. Dernier, Esq.; Gibson & Dernier LLP

(57) ABSTRACT

An inspection apparatus specifies a region for displaying an advertisement from an image of a virtual space. The inspection apparatus comprises: an image mapping unit that maps an image, which uses a color that is not used in the virtual space and where the display status of the advertisement varies in accordance with a viewpoint of a user, on a region where the advertisement is to be displayed in the virtual space; an inspection image acquiring unit that acquires a virtual space that is actually displayed on a screen on a frame-by-frame basis; and an advertisement region extracting unit operative to extract, by color-filtering the acquired image of the virtual space, a region that is rendered with a color that is not used in the virtual space, as a region for displaying the advertisement perceived by a user.

7 Claims, 15 Drawing Sheets

FIG.5

| DEGREE OF EXPOSURE | EVALUATION BASIS | CRITERION |
|---|---|---|
| LARGE | DISPLAY TIME | 3 SECONDS |
|  | SCREEN OCCUPANCY RATE | 25% |
|  | VALID DISPLAY RATE | 50% |
| MEDIUM | DISPLAY TIME | 3 SECONDS |
|  | SCREEN OCCUPANCY RATE | 5% |
|  | VALID DISPLAY RATE | 80% |
| SMALL | DISPLAY TIME | 3 SECONDS |
|  | SCREEN OCCUPANCY RATE | 1% |
|  | VALID DISPLAY RATE | 95% |

28 ures or the like of an object in the virtual space changes as seen from the user. In the following description, as an example of objects in a virtual space, objects that display advertisements (hereinafter referred to as merely "advertisement") of products or services are assumed.

IMAGE PROCESSING APPARATUS AND IMAGE PROCESSING METHOD

FIELD OF THE INVENTION

This invention generally relates to data processing technology, and more particularly, to technology for processing an image of the virtual space of games or the like.

DESCRIPTION OF THE RELATED ART

As a technology for detecting the existence of a specific object included in images of a virtual space, a technology is known where reference images are prepared in advance and where the reference images and the images of a virtual space, in which a determination of whether the object exists takes place, are compared with each other.

See, for example, Japanese patent application: Publication No. 2008-012103.

SUMMARY OF THE INVENTION

A Problem to be Solved by the Invention

Some applications of games or the like change the appearance of a virtual space according to the viewpoint that is set by a user and change the display status of objects in the virtual space.

In the case of detecting a specific object from the images displaying such a virtual space, the cost increases with the method of comparing the reference images with the images of a virtual space, in which a determination of whether the object exists is made. For example, it is necessary to prepare in advance a lot of images for reference that correspond to a variety of display statuses of the object. Further, a lot of comparison processing is required.

In this background, a main purpose of the present invention is to provide technology for easily detecting a specific object in an image of a virtual space where the display status of the space changes according to the view point set by a user.

In order to approach the problem mentioned above, an inspection apparatus for specifying a region for displaying a predetermined object from an image of a virtual space is provided, according to one embodiment of the present invention. The inspection apparatus comprises: a image mapping unit operative to map an image, which uses a color that is not used in the virtual space where the display status of the object varies in accordance with a viewpoint of a user, on a region where the object is to be displayed in the virtual space, an image acquiring unit operative to acquire a virtual space that is actually displayed on a screen on a frame-by-frame basis; and a region extracting unit operative to extract, by color-filtering the acquired image of the virtual space, a region which is rendered with a color that is not used in the virtual space, as a region for displaying the object perceived by a user.

According to another embodiment of the present invention, a method for specifying a region for displaying a predetermined object from an image of a virtual space is provided. The inspection method comprises: mapping an image, which uses a color that is not used in the virtual space and where the display status of the object varies in accordance with a viewpoint of a user, on a region where the object is to be displayed in the virtual space, acquiring a virtual space that is actually displayed on a screen on a frame-by-frame basis; and extracting, by color-filtering the acquired image of the virtual space, the region that is rendered with the color that is not used in the virtual space, as a region for displaying the object perceived by a user.

Optional combinations of the aforementioned constituting elements and implementations of the invention in the form of apparatuses, methods, systems, computer programs, and a recording medium encoded with a program may also be practiced as additional modes of the present invention.

The present invention enables the detection of a specific object in the images of a virtual space where the display status of the space changes according to the viewpoint established by a user.

BRIEF DESCRIPTION OF THE DRAWINGS

FIG. 5 shows an example of condition for determining the first index;

DETAILED DESCRIPTION OF THE PREFERRED EMBODIMENTS

Figure 1:
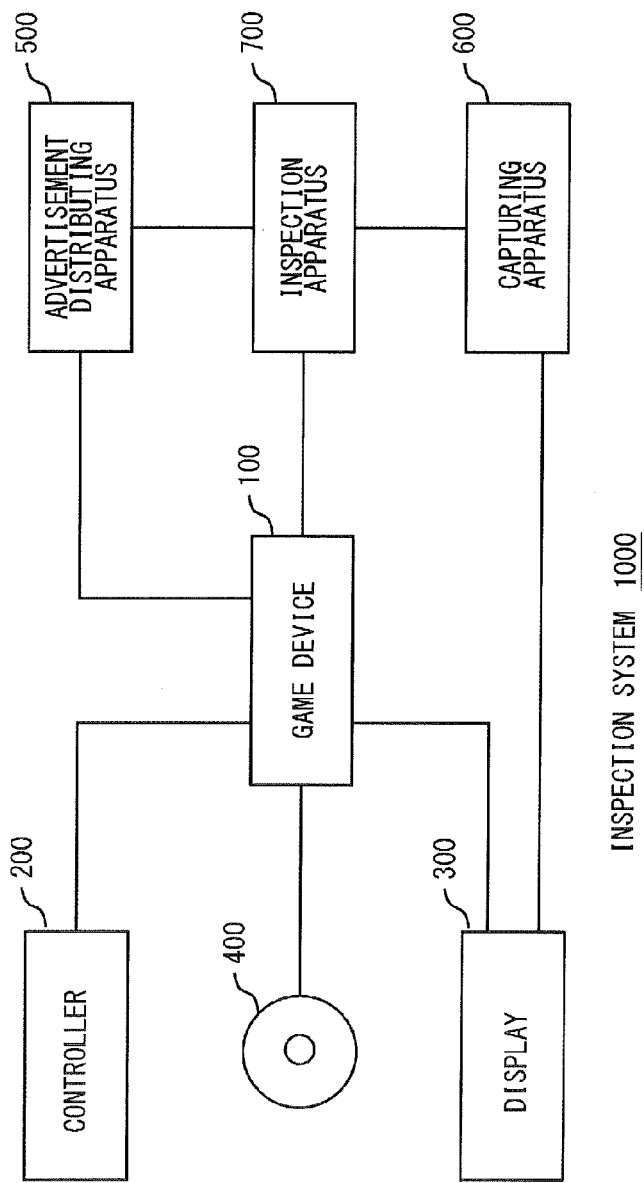
FIG. 1 shows the structure of an inspection system according to an embodiment of the present invention.

First, an explanation on the general outline of embodiments of the present invention will be given before an explanation on the structure thereof will be given.

According to the present embodiment, a suggestion is made for technology for inspecting the application of a game that displays a virtual space, such as an urban area, or the like (hereinafter referred to as a "game application," as appropriate). In the virtual space according to the present embodiment, the display status of the virtual space changes according to the viewpoint setting that is established by a user. In other words, according to the setting of the viewpoint set up by a user, the appearance of, for example, the shapes or the like of an object in the virtual space changes as seen from the user. In the following description, as an example of objects in a virtual space, objects that display advertisements (hereinafter referred to as merely "advertisement") of products or services are assumed.

A game application has information on what is displayed and where in the virtual space it is displayed. Therefore, even in case the display status of the virtual space changes according to the viewpoint set by the user, the size (hereinafter referred to as "advertisement exposure size," as appropriate)

of an area where an advertisement is displayed and exposed so as to be visible to a user in the virtual space can be calculated. A function for calculating the advertisement exposure size in a game application is hereinafter referred to as an "advertisement exposure calculating function." By providing the size of the exposure of advertisements from the game application to an external charging processing apparatus, the charging processing apparatus can calculate the appropriate advertisement fee.

However, things are different when inspecting the consistency of the advertisement exposure size output from the advertisement exposure calculating function, particularly when inspection is made while the execution status of the game application (e.g., data or the like stored in memory) is in a black box. The display status of the advertisement region constantly varies, and the advertisement exposure size varies, accordingly. Thus, it has been difficult to verify whether or not the advertisement exposure size output from the advertisement exposure calculating function is correct.

The present inventor has thought of specifying the advertisement displaying area while utilizing an image of the virtual space output by the game application, finding the advertisement exposure size thereof, and checking both the advertisement exposure size thereof and the advertisement exposure size output from the advertisement exposure calculating function. This enables to verify the consistency of the advertisement exposure size output from the advertisement exposure calculating function of the game application without referring to the execution status of the game application.

There are two methods for specifying the advertisement displaying area using the image of a virtual space. The first method is a check by a human inspector with his/her own eyes. The second method is matching the image of the virtual space and a number of reference images that record an advertisement displaying region in a variety of display statuses.

However, the former method imposes a heavy burden on the inspector. With the latter method, it is necessary to prepare in advance a lot of images for reference that correspond to a variety of display statuses of the advertisement displaying area. Further, a lot of comparison processing is required. In addition, a part of a billboard is sometimes hidden by a bloc and not displayed, which makes the identification, by image matching, of the advertisement displaying area difficult.

Therefore, the present inventor has further thought of a method for specifying an advertisement displaying area using an image of a virtual space, where a color that is not used in the virtual space is set for the advertisement displaying areas in advance. According to this method, by color-filtering the images of the virtual space, the advertisement displaying areas can be specified with ease without depending on the display status of the advertisement displaying areas. An explanation on the structure of embodiments will be given below.

FIG. 1 shows the structure of an inspection system according to an embodiment of the present invention. The inspection system 1000 comprises a game device 100, an advertisement distributing apparatus 500, a capturing apparatus 600, and an inspection apparatus 700. These apparatuses are mutually connected via a commonly-known communication means, such as a LAN, a WAN, the Internet, or the like.

The game device 100 is readout from a recording medium 400 and is executed. Hereinafter, the game device 100 is assumed to be executing a game application unless expressly noted.

The game device 100 displays the images of a virtual space on the display 300. Further, the game device 100 displays an advertisement on a predetermined area (herein after referred to as "advertisement region," as appropriate) of a sign, a billboard, or the like in the virtual space. The game device 100 calculates an index (hereinafter, referred to as a "first index," as appropriate) relating to the amount of exposure of the advertisement in the virtual space and notifies the inspection apparatus 700 thereof.

Further, the game device 100 detects the user's manipulation of the controller 200, changes the viewpoint of the user in the virtual space according to the user's manipulation, and changes the display status of the virtual space according to the change of the viewpoint. When changing the display status of the virtual space, the display status of an advertisement displayed in the virtual space is also changed. For example, assume the user's viewpoint is changed from the status where the user fully faces the advertisement to a status where the user's line of sight is parallel to the advertisement. Then the display status of the advertisement also changes from a status where the advertisement is displayed full face with a large size to a status where the advertisement is displayed on the left or the right side with a relatively small size. A description on the detailed structure of the game device 100 will be given later.

The advertisement distributing apparatus 500 retains data of advertisements to be displayed in the game device 100 and provides the game device 100 with the data on advertisements in response to a request from the game device 100. Further, the advertisement distributing apparatus 500 receives an image (hereinafter referred to as "advertisement inspection image," as appropriate) of the advertisement for inspection, performed by the inspection apparatus 700, and stores the data. When inspecting the game application, the advertisement inspection image is provided to the game device 100.

The capturing apparatus 600 captures an image of the virtual space displayed on the display 300 and generates moving image data that records the screen image of the virtual space. The capturing apparatus 600 provides the moving image data to the inspection apparatus 700.

The inspection apparatus 700 executes the inspection of the game application recorded on the recording medium 400. Here, the consistency of the advertisement exposure calculating function, which is one of the functions of the game application and is executed in the game device 100, is inspected in particular.

More specifically, from the screen image of the virtual space acquired through the capturing apparatus 600, the inspection apparatus 700 calculates an index (hereinafter, referred to as a "second index," as appropriate) relating to the amount of exposure of the advertisement, while using the degree of visibility for users as a basis. The inspection apparatus 700 then verifies the consistency of the advertisement exposure calculating function of the game application by cross-checking the first index and the second index. A description on the detailed structure of the inspection apparatus 700 will be given later.

Figure 2:
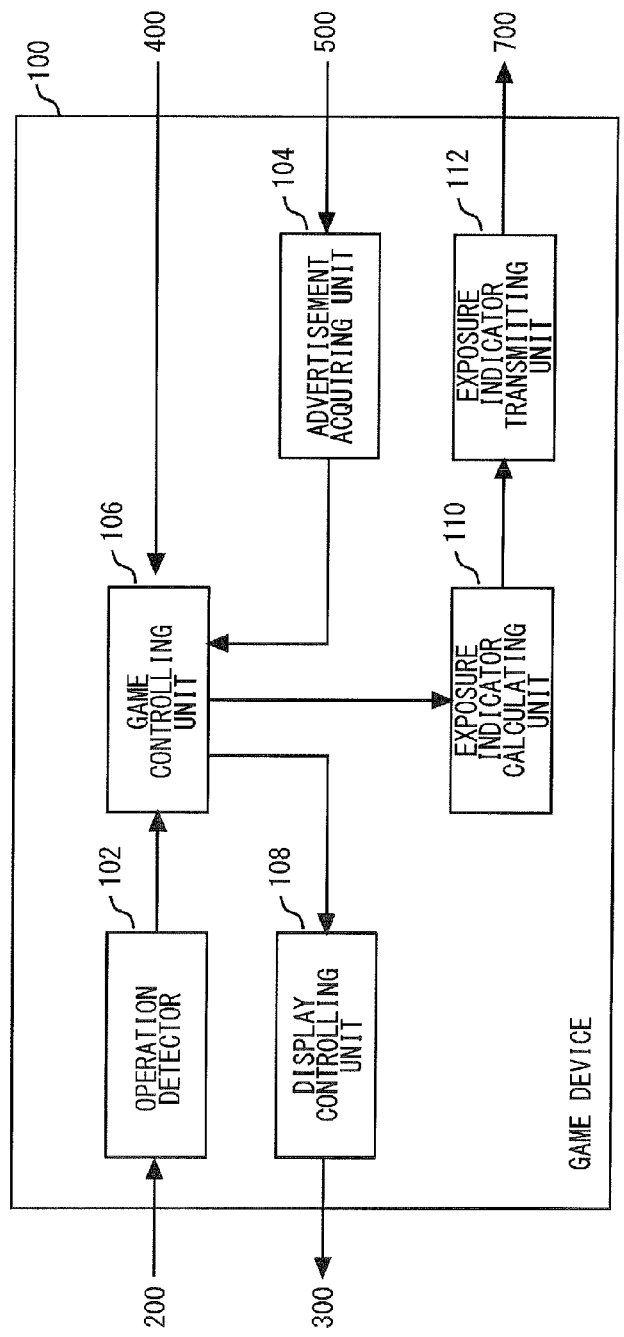
FIG. 2 is a block diagram showing functional structure of the game device of FIG. 1.

FIG. 2 is a block diagram showing the functional structure of the game device 100 of FIG. 1. The game device 100 is provided with an operation detector 102, an advertisement acquiring unit 104, a game controlling unit 106, a display controlling unit 108, an exposure indicator calculating unit 110, and an exposure indicator transmitting unit 112.

The blocks as shown in block diagrams of this specification may be implemented, with respect to hardware, by elements such as a CPU of a computer or by a mechanism and, with respect to software, by a computer program or the like. FIG. 2 depicts functional blocks implemented by the cooperation of hardware and software. Therefore, it will be obvious to those skilled in the art that the functional blocks may be implemented in a variety of manners by a combination of hardware and software.

The operation detector 102 detects the user's manipulation of the controller 200 and notifies the game controlling unit 106 of the details of the manipulation. Upon detecting a predetermined trigger for acquiring an advertisement, for example, when the game is started or when an advertisement is to be updated, the advertisement acquiring unit 104 acquires, from the advertisement distributing apparatus 500, the data on an advertisement to be displayed on the advertisement region in the virtual space.

The game controlling unit 106 executes a variety of calculation processes in the game application that are read out from the recording medium 400. More specifically, the game controlling unit 106 determines the colors to be displayed on the respective pixels of the display 300 in order to display an image of the virtual space on the display 300 and notifies the display controlling unit 108, accordingly. The display controlling unit 108 allows the respective pixels on the display 300 to display the colors instructed by the game controlling unit 106.

Figure 3:
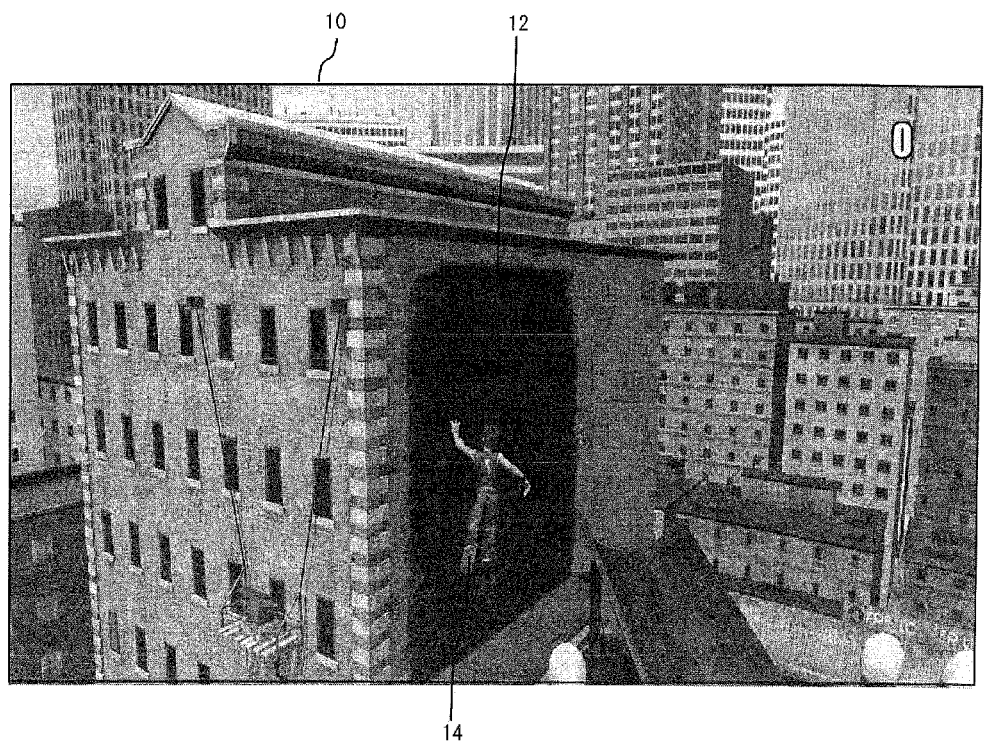
FIG. 3 shows a screen image of a virtual space.

FIG. 3 shows a screen image of the virtual space. On the virtual space screen 10, a variety of textures, such as the scenery of an urban area, or the like are displayed. The game controlling unit 106 acquires the data on an advertisement from the advertisement distributing apparatus 500 and allows the display controlling unit 108 to display on the advertisement region 12 the data on the advertisement. A block 14 is an object, for example, a character, a building, tree, or the like, that prohibits the advertisement region 12 from being displayed on the virtual space screen 10. FIG. 2 will now again be referred to.

The exposure indicator calculating unit 110 acquires from the game controlling unit 106 data (hereinafter, referred to as "actual display data," as appropriate) indicating what is displayed for each of the pixels of every screen image generated by the game controlling unit 106, i.e., each frame. The actual display data is, in other words, data indicating which object is displayed on which pixel. In the present embodiment, it is assumed that one frame is generated for every sixtieth of a second (1/60 second). The exposure indicator calculating unit 110 calculates the first index based on the actual display data. The exposure indicator transmitting unit 112 transmits the first index calculated by the exposure indicator calculating unit 110 to the inspection apparatus 700.

A specific explanation on the calculation method of the first index in the exposure indicator calculating unit 110 will be given. First, the exposure indicator calculating unit 110 calculates a screen occupancy rate and a valid display rate, which both indicate the actual display record of the advertisement in accordance with the actual display data. By this process, the data chronologically indicating the screen occupancy rate and the valid display rate for the respective frame (hereinafter referred to as "basic indices," as appropriate) is calculated.

The screen occupancy rate is a ratio of the area of the displayed advertisement region 12 visible to the user compared to the whole virtual space screen 10. For the screen occupancy rate, the exposure indicator calculating unit 110 calculates, for example, the ratio of the number of pixels on which the displayed advertisement region 12 is visible to the user compared to the number of whole pixels of the whole virtual space screen 10.

The valid display rate is a ratio of the area of the displayed advertisement region 12 visible to the user compared to the whole advertisement region 12. As a valid display rate, the exposure indicator calculating unit 110 calculates, for example, the ratio of the number of pixels on which the displayed advertisement region 12 is visible to the user compared to the number of pixels of the whole advertisement region 12. In the present embodiment, being "visible to the user" means that the advertisement region 12 is displayed without running off the edge of the virtual space screen 10 or without being blocked by a block 14, etc.

Figure 4A:
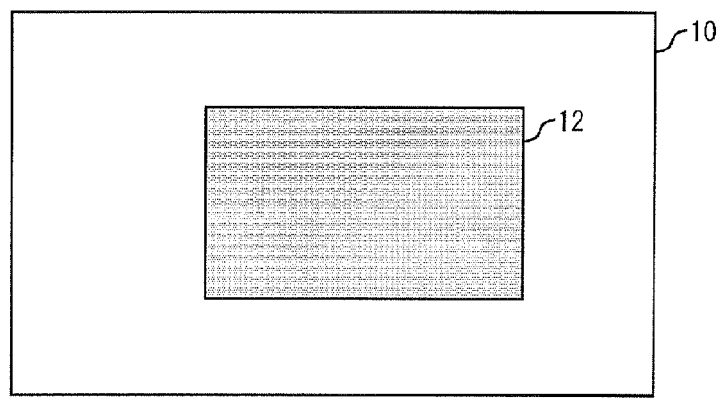
FIGS. 4A, 4B, and 4C show the relationship between a virtual space screen and an advertisement region.
Figure 4B:
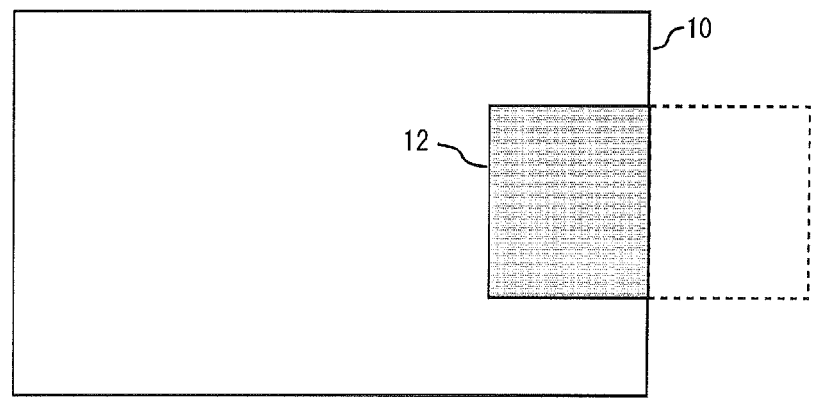
Figure 4C:
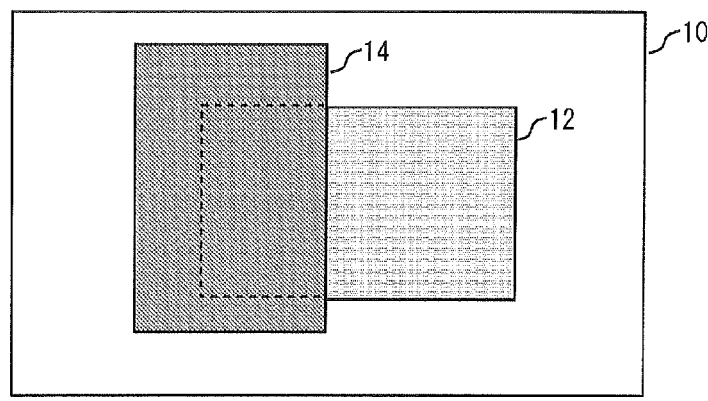

FIG. 4 shows the relationship between the virtual space screen 10 and the advertisement region 12. An explanation will be given here on a concrete calculated value of the screen occupancy rate and the valid display rate while referring to FIG. 4. FIG. 4A shows the status where a whole advertisement region 12 is displayed on a virtual space screen 10 that occupies 25 percent of the screen. In this case, the exposure indicator calculating unit 110 calculates and determines the screen occupancy rate as 25 percent and the valid display rate as 100 percent. FIG. 4B shows the status where 50 percent of the advertisement region 12 is displayed on the virtual space screen 10. In this case, the exposure indicator calculating unit 110 calculates and determines the screen occupancy rate as 12.5 percent and the valid display rate as 50 percent. FIG. 4C shows the status where 40 percent of the advertisement region 12 is obstructed by a block 14 in the virtual space screen 10. In this case, the exposure indicator calculating unit 110 calculates and determines the screen occupancy rate as 15 percent and the valid display rate as 60 percent.

After calculating the basic indices, the exposure indicator calculating unit 110 calculates the first index based on the basic indices. More specifically, the degree of exposure, which indicates the size of the exposed advertisements in the virtual space during a predetermined period is categorized into three categories, namely, "large", "medium", and "small", and then the number of times that it may respectively fall under these categories is calculated as the first index. The first index that is eventually calculated is, for example, data indicating "large: once, medium: twice, small: seven times."

FIG. 5 shows an example of the conditions for determining the first index. The "evaluation basis" field in FIG. 5 indicates the data items that are used to determine the degree of exposure. The "criterion" field indicates the value of evaluation basis that is used as the threshold value.

In FIG. 5, all values for "display time" listed under criterion are three seconds. Therefore, the exposure indicator calculating unit 110 specifies 180 frames included in the basic indices that are consecutive in a temporal sequence and whose screen occupancy rate is more than 0. If the screen occupancy rate is more than or equal to 25 percent and the valid display rate is more than or equal to 50 percent for any of the 180 frames, the number falling into the category under which the degree of exposure is "large" is incremented by one. If the condition for the "large" exposure degree is not met, if the screen occupancy rate is more than or equal to 5 percent, and if the valid display rate is more than or equal to 80 percent for any of the 180 frames, the number falling into the category under which the degree of exposure is "medium" is incremented by one.

If the condition for the exposure degree "medium" is not met either, if the screen occupancy rate is more than or equal to 1 percent, and if the valid display rate is more than or equal to 95 percent for any of the 180 frames, the number falling into the category under which the degree of exposure is "small" is incremented by one. If any the conditions are not met, no categories of the degree of exposure are incremented. After specifying the degree of exposure of the aforementioned 180 frames, the exposure indicator calculating unit 110 executes the specification process for the following 180 frames.

Figure 6:
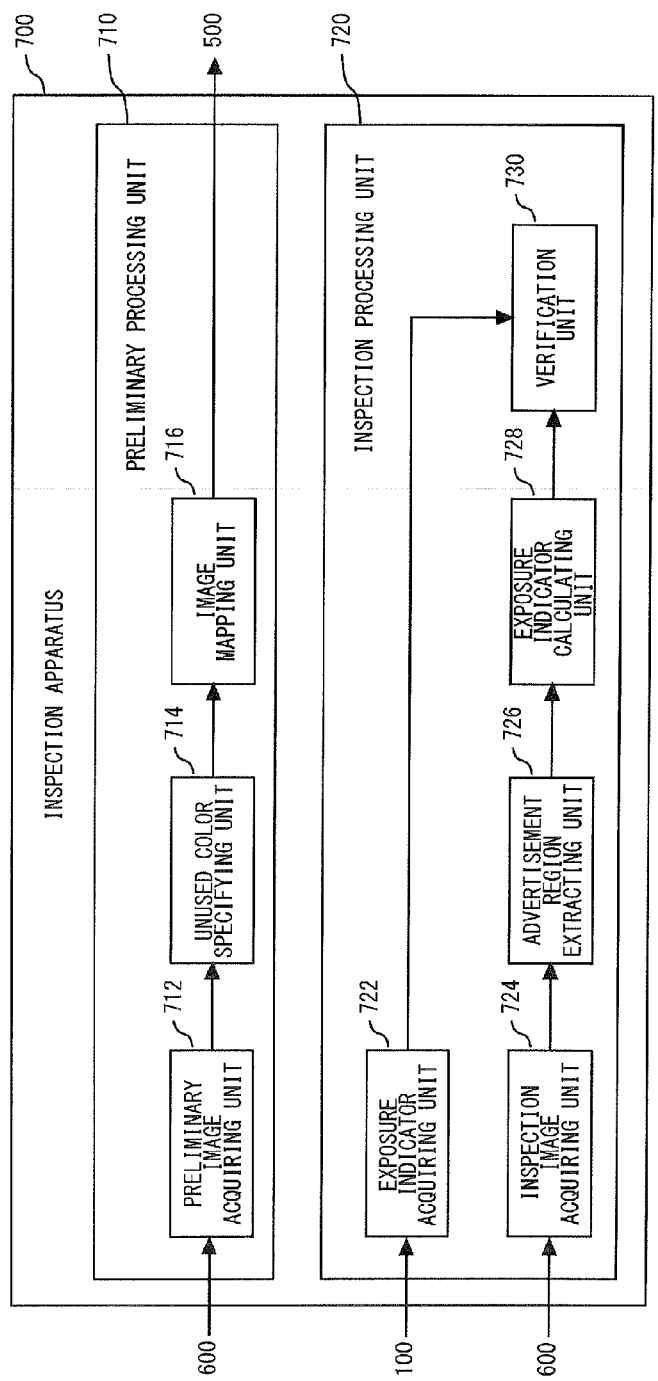
FIG. 6 is a block diagram showing the functional structure of the inspection apparatus of FIG. 1.

FIG. 6 is a block diagram showing the functional structure of the inspection apparatus 700 of FIG. 1. The inspection apparatus 700 is provided with a preliminary processing unit 710 and an inspection processing unit 720. The preliminary processing unit 710 generates an advertisement image for the inspection as a preliminary preparation for the calculation of the second index by the inspection processing unit 720. The inspection processing unit 720 cross-checks the first index calculated by using the advertisement inspection image in the game device 100 and the second index calculated based on the screen image of the virtual space that includes the advertisement inspection image.

The preliminary processing unit 710 includes a preliminary image acquiring unit 712, an unused color specifying unit 714, and an image mapping unit 716. The preliminary image acquiring unit 712 acquires from the capturing apparatus 600 the moving image data of the virtual space displayed on the display 300. Then the preliminary image acquiring unit 712 extracts still image data for each frame from the moving image data as a preliminary image.

When the capturing apparatus 600 captures a screen image in the acquisition phase for acquiring the preliminary image, colors that do not later hinder the process of specifying unused color performed by the unused color specifying unit 714, which will be described later, are set for the advertisement region 12 in the virtual space. For example, an advertisement (hereinafter, referred to as "dummy advertisement") is set using colors that are not determined to be of the color used in the virtual space screen 10. The advertisement distributing apparatus 500 may provide the game device 100 with a dummy advertisement where black is set as the non-prohibiting color described above.

Figure 7:
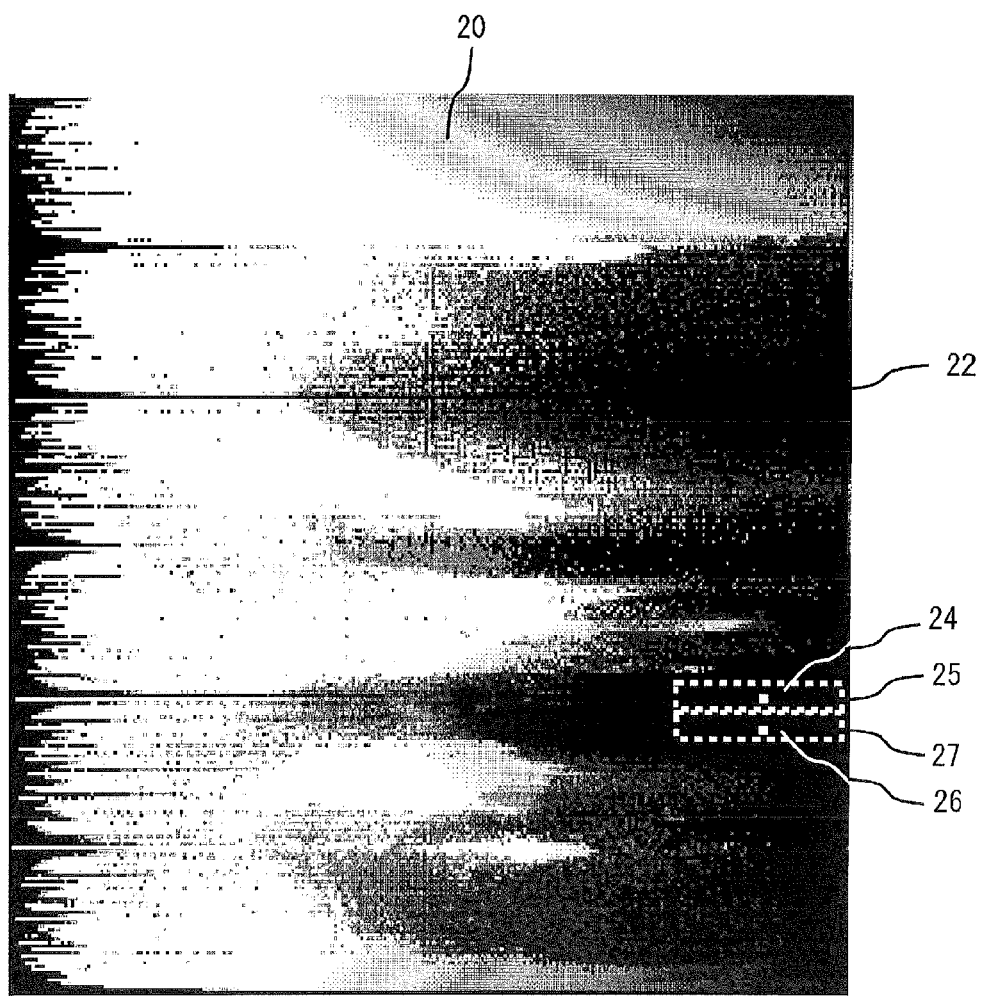
FIG. 7 shows a distribution of colors used in a virtual space.

The unused color specifying unit 714 specifies a color that is not used in the virtual space provided by the game application. A concrete explanation will be given in the following while referring to FIG. 7. FIG. 7 shows a distribution of colors used in the virtual space. In FIG. 7, the vertical axis indicates the distribution of the hue, and the horizontal axis indicates the distribution of the saturation.

First, the unused color specifying unit 714 specifies colors used in each of the plurality of preliminary images extracted by the preliminary image acquiring unit 712, and sets the area corresponding to the color as a used region 20. Next, the unused color specifying unit 714 determines a first inspection color range 25 and a second inspection color range 27 in the unused region 22, which indicates the area other than the used region 20. The first inspection color range 25 and second inspection color range 27 are a group of colors having certain attributes where hue and saturation are in a predetermined range. In this process, the first inspection color range 25 and second inspection color range 27 are preferably determined so that their hues are laid side-by-side, as shown in FIG. 7.

Next, the unused color specifying unit 714 determines one of the colors included in the first inspection color range 25, typically a median color, with regard to the hue and saturation in the first inspection color range 25 and determines the color to be the first inspection color 24. In a similar manner, the unused color specifying unit 714 determines the second inspection color 26 from the colors included in the second inspection color range 27. As will be described later, each color included in the first inspection color range 25 is identified to be of the same color as the first inspection color 24, and each color included in the second inspection color range 27 is identified to be of the same color as the second inspection color 26 in the inspection processing unit 720. As the size of the first inspection color range 25 and second inspection color range 27, the size that allows each color to be appropriately identified as the same color as the first inspection color 24 or the second inspection color 26, respectively, may be set based on company knowledge or by experiment, performed by the present system. FIG. 6 will now again be referred to.

The image mapping unit 716 uses the first inspection color 24 and the second inspection color 26 specified by the unused color specifying unit 714 and generates an advertisement inspection image. The image mapping unit 716 transmits the generated advertisement inspection image to the advertisement distributing apparatus 500 and allows the advertisement distributing apparatus 500 to provide the game device 100 with the advertisement inspection image when inspecting the game application.

Figure 8:
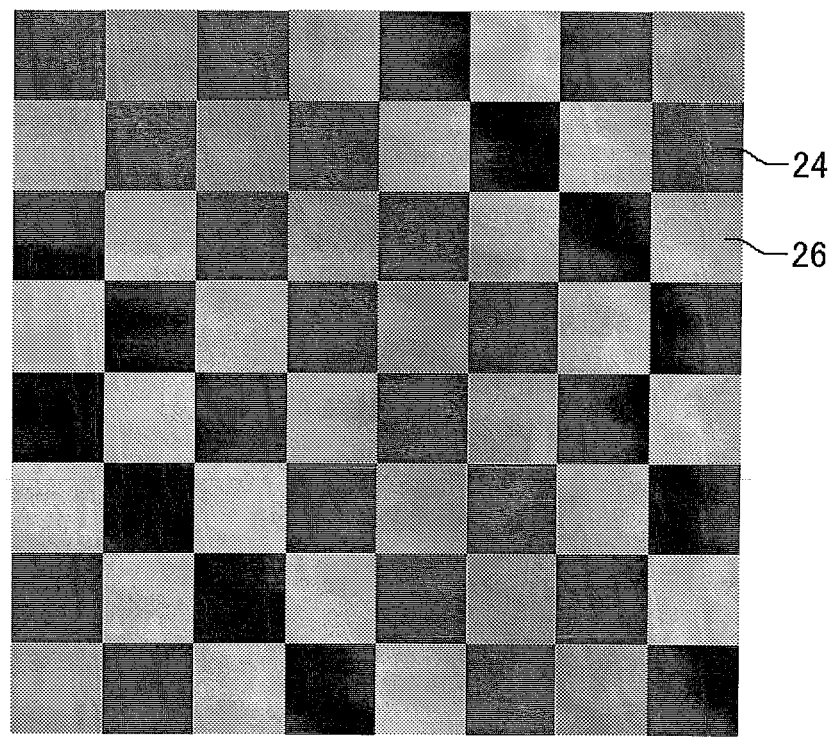
FIG. 8 shows a typical advertisement inspection image.

FIG. 8 shows a typical advertisement inspection image. As shown in FIG. 8, the image mapping unit 716 generates an advertisement inspection image 28 where patches rendered by either the first inspection color 24 or the second inspection color 26 are disposed alternately, that is, the patches are disposed so as to form a checkered pattern.

Further, when generating the advertisement inspection image 28, the image mapping unit 716 calculates the number of intersecting points formed by the boundaries of patches in the advertisement inspection image 28 and stores the number into a predetermined storage device. For example, the number of intersecting points is calculated as forty-nine for the advertisement inspection image 28 shown in FIG. 8. FIG. 6 will now again be referred to.

The inspection processing unit 720 includes an exposure indicator acquiring unit 722, an inspection image acquiring unit 724, an advertisement region extracting unit 726, an exposure indicator calculating unit 728, and a verification unit 730. The exposure indicator acquiring unit 722 acquires the first index transmitted from the game device 100.

Figure 9:
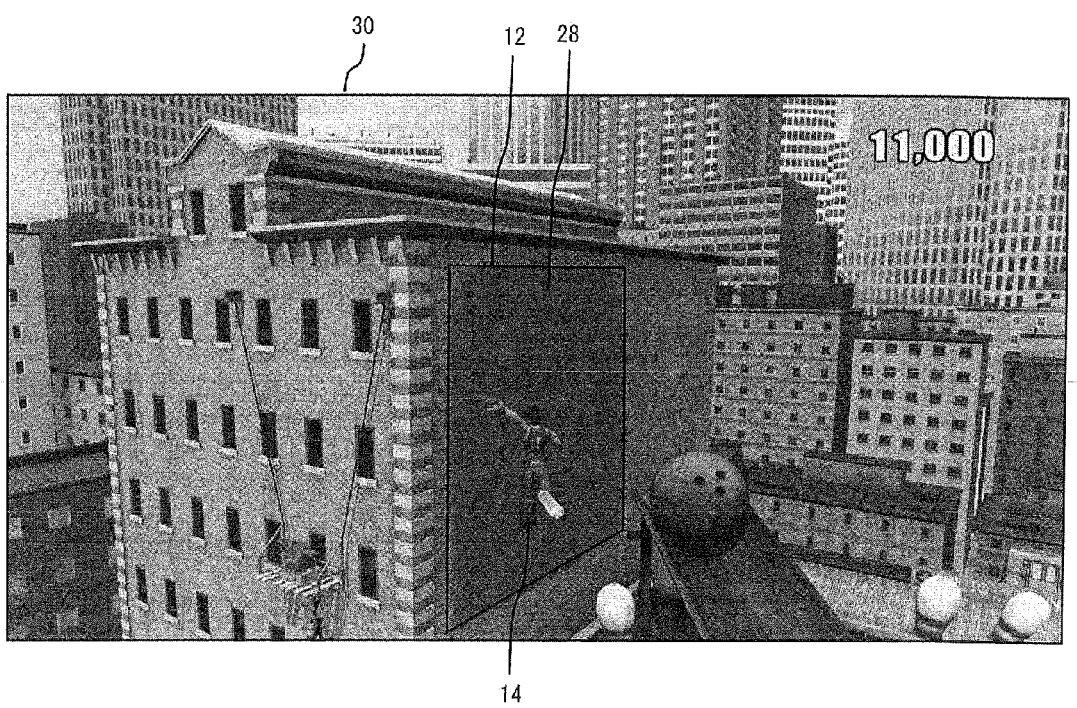
FIG. 9 shows an inspection image.

The inspection image acquiring unit 724 acquires from the capturing apparatus 600 a moving image that records screen images of the virtual space where the advertisement inspection image is set. Then, from this moving image, the inspection image acquiring unit 724 extracts still image data for respective frames as inspection images. FIG. 9 shows an inspection image. In the inspection image 30 of FIG. 9, an advertisement inspection image 28 is set on the advertisement region 12, and a part of the advertisement inspection image 28 is not visible because of a block 14. FIG. 6 will now again be referred to.

The advertisement region extracting unit 726 extracts an advertisement region that is displayed to be visible to a user by color-filtering the inspection image acquired by the inspection image acquiring unit 724 and then generates an image indicating that advertisement region (hereinafter referred to as "advertisement extract image," as appropriate). A more specific explanation on the processing performed by the advertisement region extracting unit 726 will be given below while referring to FIGS. 10A, 10B, and 10C.

Figure 10A:
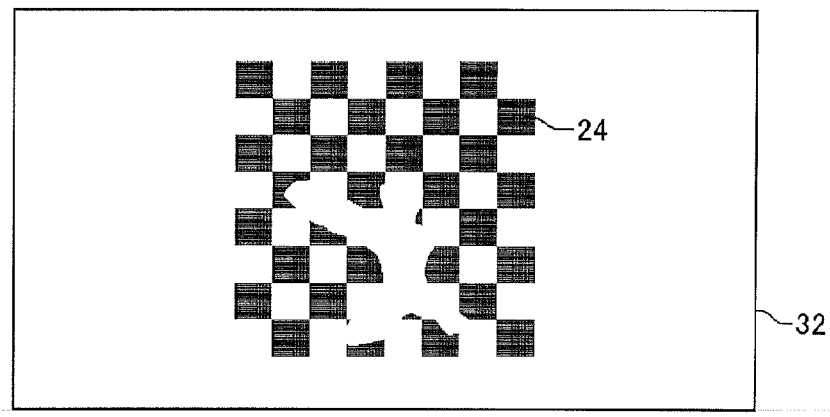
FIGS. 10A, 10B, and 10C shows a method for generating an advertisement extract image in the inspection image.
Figure 10B:
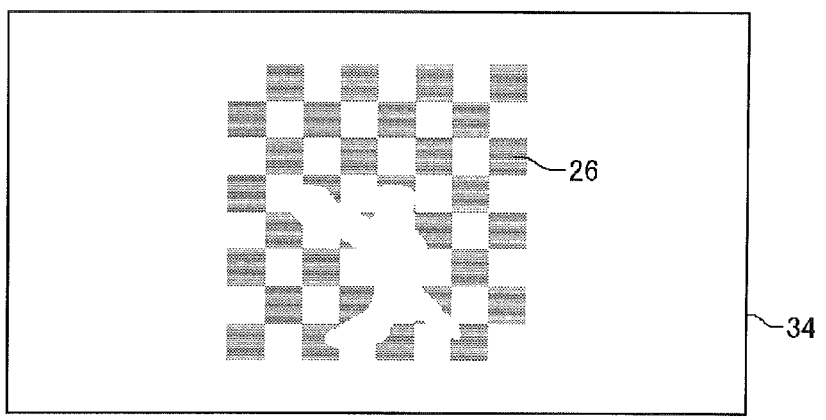
Figure 10C:
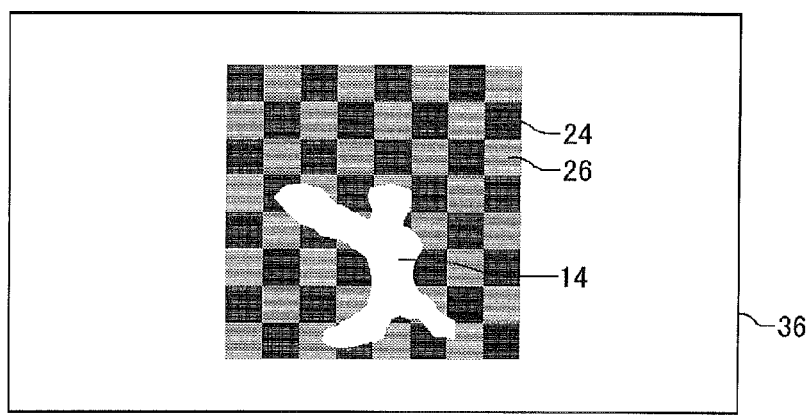

FIGS. 10A, 10B and 10C show a method for generating the advertisement extract image in the inspection image 30. For a first extract image, the advertisement region extracting unit 726 first generates an image by extracting the pixels whose pixel value in the inspection image 30 indicates the first inspection color range 25. FIG. 10A shows the first extract image 32. Secondly, for a second extract image, the advertisement region extracting unit 726 generates an image by extracting the pixels whose pixel value in the inspection image 30 indicates the second inspection color range 27. FIG. 10B shows the second extract image 34. Next, the advertisement region extracting unit 726 combines the first extract image 32 and the second extract image 34 and generates an advertisement extract image, accordingly. FIG. 10C indicates the advertisement extract image 36, where the first extract image 32 and the second extract image 34 are combined. In FIG. 10C, an area where the block 14 is to be displayed is excluded from the advertisement extract image 36.

The exposure indicator calculating unit 728 calculates the second index based on the advertisement extract image 36 generated by the advertisement region extracting unit 726. More specifically, pixels that first have pixel values indicating the color of the first inspection color range 25 or the second inspection color range 27 are specified as the advertisement region pixels. The advertisement region extracting unit 726 calculates the screen occupancy rate as the ratio of the number of the advertisement region pixels to the number of pixels of the whole advertisement extract image 36.

Next, the exposure indicator calculating unit 728 specifies a part, where pixels having the pixel values of the color of the first inspection color range 25, shifts to the pixels having the pixel values of the color of the second inspection color range 27 among the specified advertisement region pixels as the boundary of patches. Then the exposure indicator calculating unit 728 specifies the intersections formed by the boundaries of patches and counts the number thereof.

Figure 11:
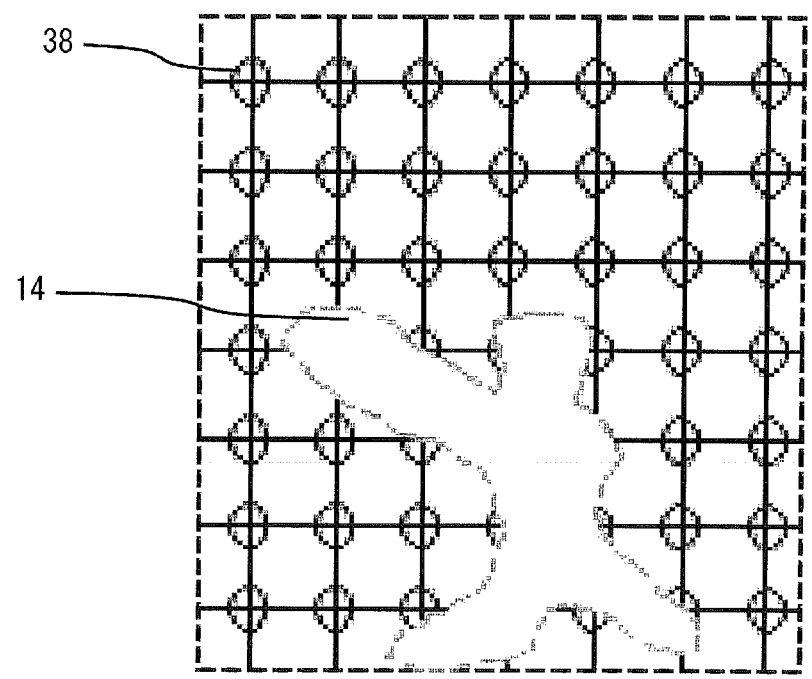
FIG. 11 schematically shows the boundary of the patches in the advertisement extract image.

FIG. 11 schematically shows the boundary of patches in the advertisement extract image 36. In the case of FIG. 11, forty intersections 38 existing in the advertisement extract image 36, that is, those not being hidden by the block 14, are counted. The exposure indicator calculating unit 728 refers to a predetermined storage device and acquires the total number of intersecting points of the advertisement inspection image 28, which is calculated by the image mapping unit 716 beforehand. Then, the valid display rate is calculated as the ratio of the number of intersecting points existing in the advertisement extract image 36 to the total number of the intersecting points. In the case shown in FIG. 11, the total number of intersecting points is forty-nine, and the number of intersections 38 in the advertisement extract image is forty. Therefore, the valid display rate is calculated to be 81.6 percent.

Next, the exposure indicator calculating unit 728 calculates the second index based on the screen occupancy rate and the valid display rate. The format of the second index is similar to that of the first index, which is described above. The method for calculating the second index based on the screen occupancy rate and the valid display rate is also similar to that of the first index. Typically, the condition same as that for determining the first index, which is shown in FIG. 5, is also applicable to the calculation of the second index. However, the conditions for determining the first index may be adjusted appropriately when applied as the conditions for determining second index, based on the knowledge of a company or an experiment performed by the present system. FIG. 6 will now again be referred to.

The verification unit 730 cross-checks the first index acquired by the exposure indicator acquiring unit 722 and the second index calculated at the exposure indicator calculating unit 728. If the first index and the second index are identical or if the difference between them falls within a predetermined range, the verification unit 730 determines that the exposure indicator calculating unit 110 of the game device 100 functions properly. In other words, the verification unit 730 determines that the advertisement exposure calculating function of the game application loaded to the game device 100 is implemented properly. As the predetermined range mentioned above, an appropriate range may be set based on the knowledge of a company or an experiment performed by the present system, etc. The verification unit 730 stores the results of the determination into a predetermined storage device as appropriate or notifies a predetermined external device of the results of the determination, as appropriate. For example, the determination result may be displayed on a display (not shown) of the inspection apparatus 700 or may be given as a notice to the PC terminal of the inspector.

An explanation on the operation of the configuration described above will be given below.

Figure 12A:
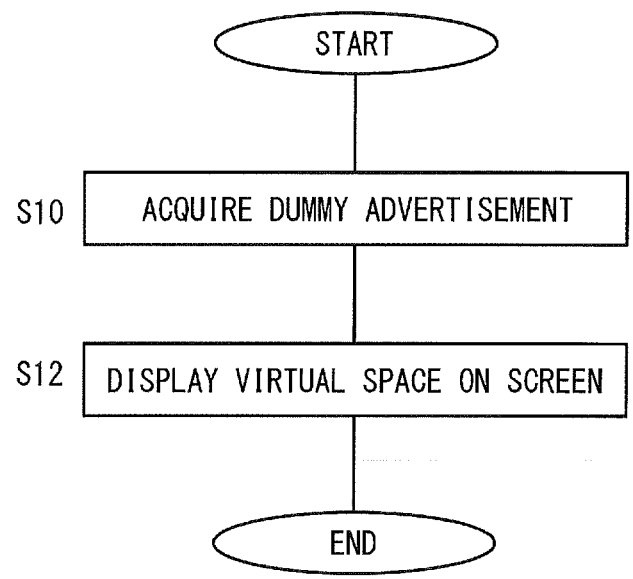
FIG. 12A is a flowchart showing the operation of the game device at the preparation stage for the inspection.

FIG. 12A is a flowchart showing the operation of the game device 100 at the preparation stage for the inspection. The advertisement acquiring unit 104 acquires a dummy advertisement from the advertisement distributing apparatus 500 (S10). While controlling the game, the game controlling unit 106 allows, via the display controlling unit 108, the display 300 to display a virtual space where the dummy advertisement is displayed on the advertisement region (S12). In this process, the capturing apparatus 600 acquires the moving image data of the virtual space displayed on the display 300.

Figure 12B:
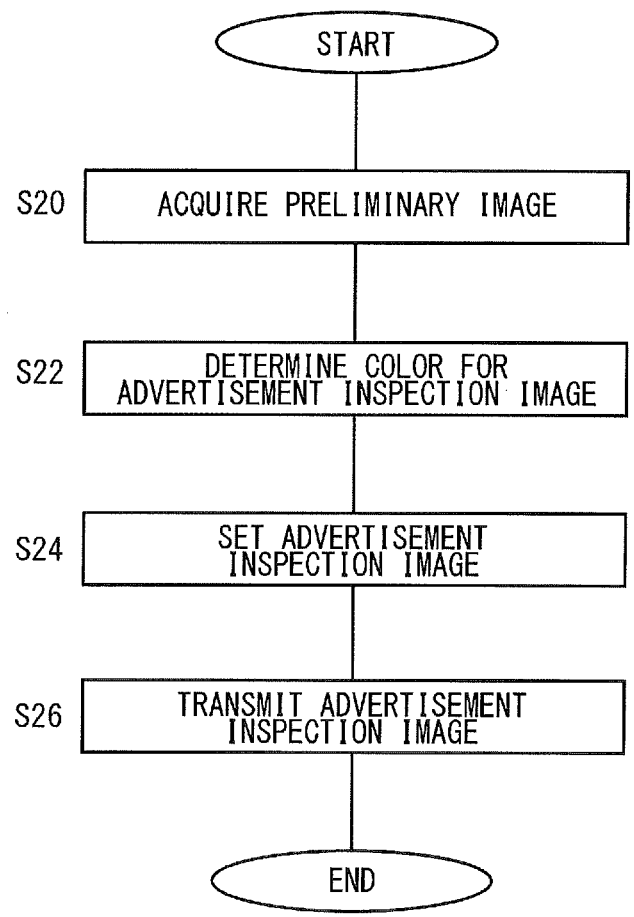
FIG. 12B is a flowchart showing the operation of an inspection device at the preparation stage for the inspection.

FIG. 12B is a flowchart showing the operation of the inspection apparatus 700 at the preparation stage for inspection. The preliminary image acquiring unit 712 acquires the moving image data of the virtual space where the dummy advertisement is displayed on the advertisement region from the capturing apparatus 600 and acquires a plurality of preliminary images on a frame by frame basis from the moving image data (S20). The unused color specifying unit 714 specifies colors used in the plurality of preliminary images, respectively, and then determines colors to be used for advertisement inspection image, the colors being included in the unused colors in the virtual space (S22). The image mapping unit 716 sets the advertisement inspection image by using the determined colors (S24) and transmits the advertisement inspection image to the advertisement distributing apparatus 500 (S26).

Figure 13A:
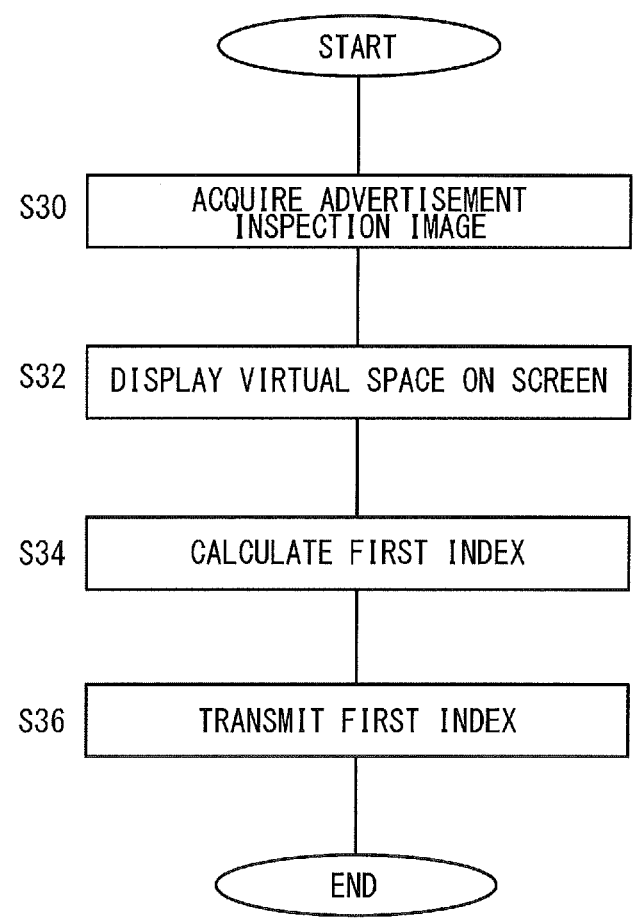
FIG. 13A is a flowchart showing the operation of the game device at the execution stage of the inspection.

FIG. 13A is a flowchart showing the operation of the game device 100 at the execution stage of the inspection. The advertisement acquiring unit 104 acquires the advertisement inspection image from the advertisement distributing apparatus 500 (S30). While controlling the game, the game controlling unit 106 allows, via the display controlling unit 108, the display 300 to display a virtual space where the advertisement inspection image is displayed on the advertisement region (S32). During this process, the capturing apparatus 600 acquires the moving image data of the virtual space displayed on the display 300. The exposure indicator calculating unit 110 calculates, based on actual display data acquired from the game controlling unit 106, the advertisement occupancy rate and the valid display rate for each frame. Then based on those, the exposure indicator calculating unit 110 calculates the first index (S34). The exposure indicator transmitting unit 112 transmits the calculated first index to the inspection apparatus 700 (S36).

Figure 13B:
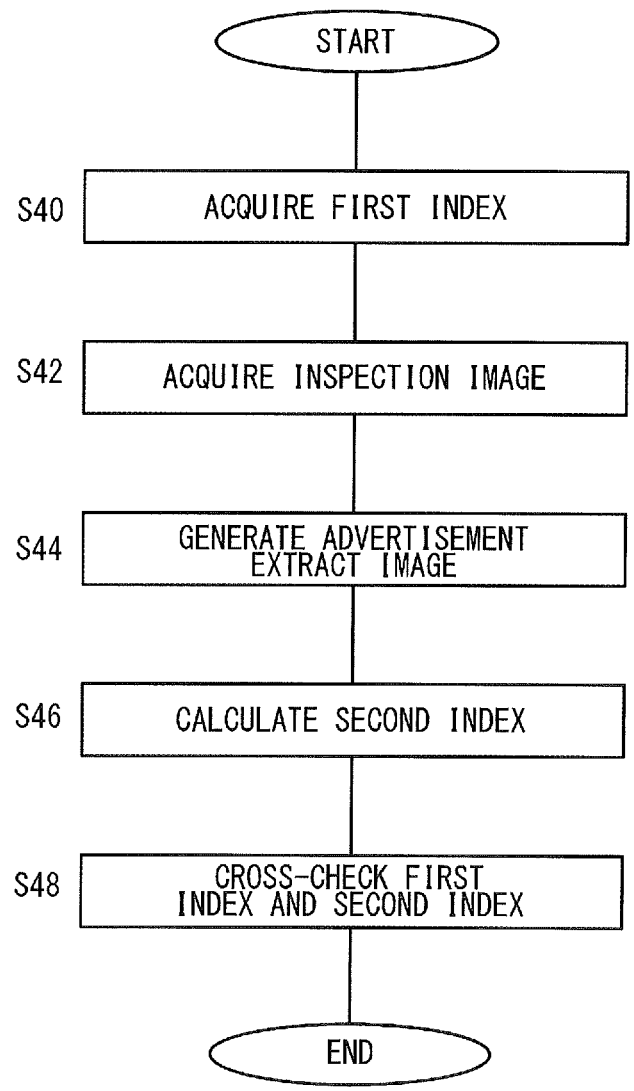
FIG. 13B is a flowchart showing the operation of an inspection device at the execution stage of the inspection.

FIG. 13B is a flowchart showing the operation of the inspection apparatus 700 at the execution stage of the inspection. The exposure indicator acquiring unit 722 acquires the first index calculated in the game device 100 (S40). The inspection image acquiring unit 724 acquires the moving image data of the virtual space where the advertisement inspection image is displayed on the advertisement region from the capturing apparatus 600 and acquires a plurality of preliminary images on a frame by frame basis from the moving image data (S42). The advertisement region extracting unit 726 generates the advertisement extract image from respective images for inspection by utilizing color-filtering (S44). The exposure indicator calculating unit 728 calculates the advertisement occupancy rate and the valid display rate for each advertisement extract image and then calculates the second index according to those rates (S46). The verification unit 730 verifies the consistency of the advertisement exposure calculating function of the game application that operates on the game device 100 by cross-checking the first index and the second index (S48).

By the inspection apparatus 700, according to the present embodiment, the first index calculated in the game device 100 that operates a game application to be inspected and the second index calculated based on the actual images of the virtual space are cross-checked. This enables one to verify the consistency of the advertisement exposure calculating function of the game application without referring to the execution status of the game application even if the display status of advertisements in the virtual space varies according to the viewpoint set by a user.

Further, by the inspection apparatus 700, an advertisement inspection image that uses the inspection colors that are not used in the virtual space is mapped on the advertisement region in the virtual space when the game application is inspected. This enables one to specify the displayed advertisement region that is visible to a user easily and speedily by utilizing color-filtering even if the display status of advertisements in the virtual space varies according to the viewpoint set by a user.

In addition, by the inspection apparatus 700, a displayed advertisement region that is visible to a user is specified, and the advertisement extract image is generated, while the inspection color that is set for the advertisement inspection image and the colors having similar color attributes with that of the inspection color are identified as a same color. Some game application sets a display effect, such as a far-away landscape, in the virtual space displayed opaquely, etc. In this case, the color of the advertisement inspection image set for an advertisement space in the virtual space may be changed when the virtual space is displayed on the screen. Setting a range of colors that are identified as the inspection color helps to appropriately identify the displayed advertisement region that is visible to a user, even in case such display effects are applied.

Further, by the inspection apparatus 700, the advertisement images are set as a checkered pattern formed by patches rendered with one of the two inspection colors. Then, the valid display rate is calculated as the ratio of the number of intersecting points formed by the boundaries of patches in the advertisement extract image to the number of the intersecting points formed by the boundaries of patches in the advertisement inspection image. In the virtual space, the shape of the advertisement inspection image constantly varies, and a part of the image may not be displayed because of a block or the like. Thus, when calculating the valid display rate based on the inspection image, it is difficult to obtain the total number of pixels of the whole advertisement inspection image, including the part that is not displayed. In other words, even if the number of pixels of the whole advertisement image in one display status has been calculated in advance, since the shape of the advertisement inspection image changes, using the number of pixels calculated beforehand when calculating the valid display rate in accordance with the shape for each frame is sometimes not appropriate. By adopting the number of intersections as a scale for the valid display rate as in the case described above, the valid display rate similar to the valid display rate calculated in the game device 100 can be calculated by the inspection apparatus 700 based on the inspection image, even in case where the display status of the advertisement inspection image varies constantly.

Further, by the inspection apparatus 700, colors having adjacent attributes are adopted as the range of the two inspection colors, which are used as standards when extracting an advertisement extract image from an inspection image. As described above, in the virtual space, the color of the advertisement inspection image is sometimes changed depending on the setting of the display effect. If the attributes of colors belonging to first inspection color range and the second inspection color range differ widely, sometimes it may be difficult to specify to which area a color that is generated as a result of setting the display effect and that has attributes positioned between the first inspection color range and the second inspection color range belongs. By setting respective inspection color ranges so that the attributes thereof lie adjacent to each other, the first inspection color range and the second inspection color range can be distinguished easily. Therefore, the boundaries of the patches can be specified precisely. Further, the intersections formed by the boundaries of the patches can be specified precisely.

The description of the invention given above is based upon an illustrative embodiment. This embodiment is intended to be illustrative only, and it will be obvious to those skilled in the art that various modifications to constituting elements and processes could be developed and that such modifications are also within the scope of the present invention.

In the embodiment, the first inspection color range 25 is set as a group of colors that are identified to be of the same color as the first inspection color 24, and the second inspection color range 27 is set as a group of colors that are identified to be of the same color as the second inspection color 26. In a variation of the embodiment, the first inspection color range 25 and second inspection color range 27 may not be set. In this case, color filtering is performed only for one color, and thus the processing thereof becomes faster and easier. Particularly, this embodiment is preferable in case the color of the advertisement inspection image is not changed, for example, because the display effect is not used in the virtual space, etc.

Although a simple checkered pattern is shown as a disposition pattern of patches used for the advertisement inspection image in the embodiment, other variations of the pattern may be adopted for disposition of patches on the advertisement inspection image. For example, on a part of the advertisement region that is assumed to be important, patches may be disposed so that the intersections are disposed with a higher concentration in that part compared to other parts.

Although two colors are set as inspection colors to be set on the advertisement inspection image in the embodiment, only one color may be set in a variation. Particularly, this embodiment is preferable in case the valid display rate is not necessary as the basis for evaluating the second index. In yet another variation, more than two colors may be set as the inspection colors. This enables one to distinguish respective intersections, which allows one to adjust the valid display rate depending on which intersection is displayed even if the number of intersections remains the same. For example, if the intersections exist in the center part of the advertisement inspection image in the displayed screen, a higher effective display rate may be calculated as compare to the case where the intersections exist in the end part of the advertisement inspection image.

In the embodiment, the first index and the second index that are calculated depending on the screen occupancy rate and the valid display rate are cross-checked. In a variation, the screen occupancy rate and the valid display rate calculated in the game device 100 and the screen occupancy rate and the valid display rate calculated in the inspection apparatus 700 may be directly compared. In this case, the screen occupancy rates and the valid display rates that are calculated for identical screen display times or for an identical frame ID relating to the virtual space screen 10 may be compared, respectively.

In the embodiment, the advertisement region extracting unit 726 extracts the displayed advertisement region visible to a user by color-filtering an image of the virtual space acquired on frame by frame basis (hereinafter referred to as a "frame unit image") by the inspection image acquiring unit 724. In a variation, the inspection apparatus 700 may further comprise an image adjusting unit operative to synthesize a plurality of frame unit images acquired by the inspection image acquiring unit 724 according to a predetermined criterion and to generate a new image, which is a synthesis of a plurality of frame unit images, as an inspection image. In this case, the advertisement region extracting unit 726 color-filters the inspection image generated in the image adjusting unit and extracts an advertisement region.

More specifically, the image adjusting unit may specify pixel values of corresponding pixels for respective frame unit images that are to be synthesized, may calculate an average pixel value, which is the average of those pixel values, and may set the average pixel value as the pixel value for that pixel in the inspection image. The corresponding pixels may be pixels displayed at the same location on the display 300. Further, the range of the pixel values may be stored in advance, and if a pixel value deviates from the range, that pixel may be excluded from the pixels to be synthesized, for example, from the pixels to be averaged.

According to this variation, since the frame unit images are synthesized and thus the number of the inspection images are reduced, images to be processed during a later processing, for example, the color-filtering process, the advertisement extract image generation process, or the exposure index calculation process, are reduced. This reduces the quantity of system resources that are necessary for the inspection, and fast inspection is realized. In addition, even if a display effect is applied on a part of the frame unit images, the synthesis of a plurality of frame unit images reduces the influence of the display effect, which makes it easier to properly extract the advertisement region.

In the embodiment, an explanation on the inspection apparatus 700, which inspects the advertisement exposure calculating function of a game application, has been given. However, the scope of the technological idea of the present invention is not limited to an inspection apparatus. For example, according to one embodiment of the present invention, an image using a color that is not used in the virtual space where display status changes according to a viewpoint set by a user is set on the region where the object to be detected is to be displayed. Then the existence of an object is detected by color-filtering the image of the virtual space that is actually displayed. It will be obvious to those skilled in the art that this technological idea is applicable not only to inspection apparatuses but also to entire image processing apparatuses. For example, in this image processing apparatus, after an object to be detected is detected, a predetermined post processing may be executed according to the position or the size in the virtual space of the object to be detected.

Combinations of embodiments and/or variations described above may also be practiced as additional modes of the embodiments of the present invention. New embodiments generated from the combinations have both effects of combined embodiments and variations, collectively.

It will be obvious to those skilled in the art that the functions to be fulfilled by respective constituent element described in the claims may be practiced by each constituent element by itself or in cooperation with others.

DESCRIPTION OF THE REFERENCE NUMERALS

100 . . . game device, 102 . . . operation detector, 104 . . . advertisement acquiring unit, 106 . . . game controlling unit 106, 108 . . . display controlling unit, 110 . . . exposure indicator calculating unit, 112 . . . exposure indicator transmitting unit, 700 . . . inspection apparatus, 712 . . . preliminary image acquiring unit, 714 . . . unused color specifying unit, 716 . . . image mapping unit, 722 . . . exposure indicator acquiring unit, 724 . . . inspection image acquiring unit, 726 . . . advertisement region extracting unit, 728 . . . exposure indicator calculating unit, 730 . . . verification unit, 1000 . . . inspection system.

INDUSTRIAL APPLICABILITY

The present invention is applicable to an apparatus for identifying a region where a specific object is to be displayed, the region being included in images of a virtual space.

What is claimed is:

1. An image processing apparatus for specifying a region for displaying a predetermined object from an image of a virtual space comprising:
   an image mapping unit operative to map an image, which uses a color that is not used in the virtual space where the display status of the object varies in accordance with a viewpoint of a user, on a region where the object is to be displayed in the virtual space,
   an image acquiring unit operative to acquire a virtual space that is actually displayed on a screen on a frame-by-frame basis; and
   a region extracting unit operative to extract, by color-filtering the acquired image of the virtual space, a region which is rendered with a color that is not used in the virtual space, as a region for displaying the object perceived by a user.

2. The image processing apparatus according to claim 1, wherein
   the region extracting unit also extracts the region rendered with a color that is similar to the unused color as the region for displaying the object perceived by a user.

3. The image processing apparatus according to claim 1 further comprising:
   an exposure rate estimating unit; wherein
   the image mapping unit specifies a plurality of colors that are not used in the virtual space and maps an image that is divided into a plurality of patches rendered with the respective colors on the region for displaying the object in the virtual space;
   the region extracting unit extracts a region that is rendered at least one of the plurality of unused colors as the region for displaying the object perceived by a user; and
   the exposure rate estimating unit specifies patches that exist in the extracted region for displaying the object and estimates the ratio of the region for displaying the object perceived by the user to the whole region for displaying the object in accordance with the number of intersections formed by the boundaries of the patches.

4. The image processing apparatus according to claim 3, wherein
   the image mapping unit specifies a plurality of colors that are not used in the virtual space and where the attributes relating to the colors thereof are similar with each other, and maps an image divided into a plurality of patches rendered with the respective colors on the region for displaying the object in the virtual space.

5. The image processing apparatus according to claim 1 further comprising:
   an image adjusting unit operative to generate a new image by synthesizing a plurality of images of the virtual space acquired for each frame by the image acquiring unit, in accordance with predetermined standard, wherein the region extracting unit extracts the region for displaying the object perceived by the user by color-filtering the new image generated by the image adjusting unit.

6. A method for specifying a region for displaying a predetermined object from an image of a virtual space comprising:

mapping an image, which uses a color that is not used in the virtual space and where the display status of the object varies in accordance with a viewpoint of a user, on a region where the object is to be displayed in the virtual space, acquiring a virtual space that is actually displayed on a screen of a display device on a frame-by-frame basis; and extracting, by color-filtering the acquired image of the virtual space, the region that is rendered with the color that is not used in the virtual space, as a region for displaying the object perceived by a user.

7. A non-transitory, computer readable recording medium having stored thereon a program for specifying a region for displaying a predetermined object from an image of a virtual space, the program comprising:

a mapping module operative to map an image, which uses a color that is not used in the virtual space and where the display status of the object varies in accordance with a viewpoint of a user, on a region where the object is to be displayed in the virtual space, an acquiring module operative to acquire a virtual space that is actually displayed on a screen on a frame-by-frame basis; and an extracting module operative to extract, by color-filtering the acquired image of the virtual space, the region that is rendered with the color that is not used in the virtual space, as a region for displaying the object perceived by a user.

* * * * *